United States Patent [19]

Eyuboglu

[11] Patent Number: 4,745,625

[45] Date of Patent: May 17, 1988

[54] TRANSITION DETECTOR

[75] Inventor: Vedat M. Eyuboglu, Boston, Mass.

[73] Assignee: Codex Corporation, Mansfield, Mass.

[21] Appl. No.: 839,706

[22] Filed: Mar. 12, 1986

[51] Int. Cl.$^4$ .......................................... H04L 27/06
[52] U.S. Cl. ....................................... 375/75; 375/42; 371/43
[58] Field of Search .................. 375/1, 14, 17, 37, 42, 375/67, 39; 370/107; 371/43

[56] References Cited

U.S. PATENT DOCUMENTS

| | | | |
|---|---|---|---|
| 4,041,391 | 8/1977 | Deerkoski | 375/1 |
| 4,253,186 | 2/1981 | Godard | 375/77 |
| 4,262,360 | 4/1981 | Bigo et al. | 375/77 |
| 4,290,139 | 9/1981 | Walsh | 375/14 |
| 4,293,953 | 10/1981 | Gutleber | 375/25 |
| 4,308,617 | 12/1981 | German, Jr. | 375/1 |
| 4,320,517 | 3/1982 | Godard et al. | 375/13 |
| 4,347,619 | 8/1982 | Dakin et al. | 375/37 |
| 4,355,397 | 10/1982 | Stuart | 375/17 |
| 4,416,015 | 11/1983 | Gitlin | 375/14 |
| 4,447,908 | 5/1984 | Chevillat et al. | 375/42 |
| 4,462,108 | 7/1984 | Miller | 375/97 |

Primary Examiner—Robert L. Griffin
Assistant Examiner—Stephen Chin

[57] ABSTRACT

The unknown time when a transition in a signal point sequence has occurred is determined by a trellis technique based on known subsequences of symbols that preceded and followed the transition.

20 Claims, 3 Drawing Sheets

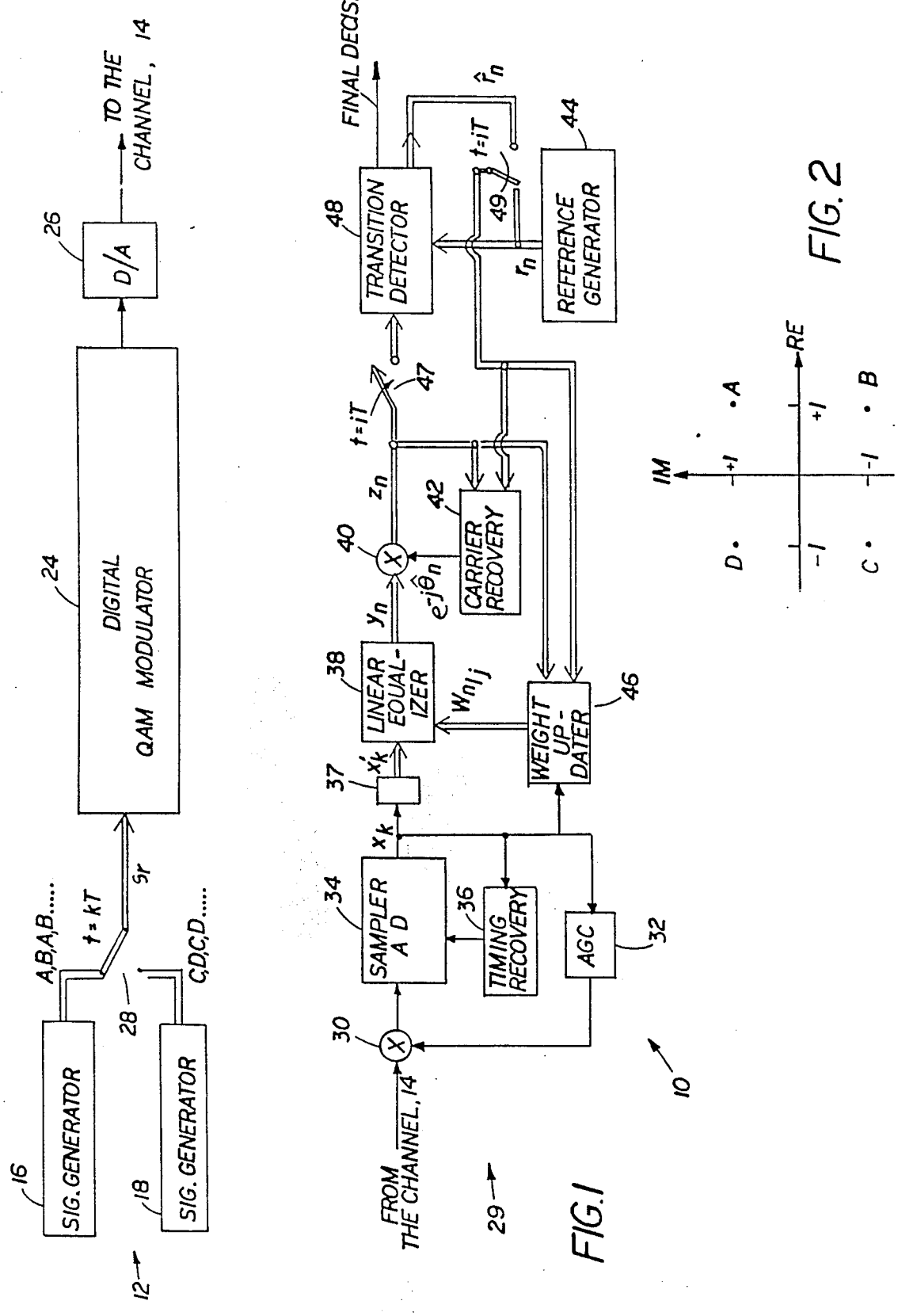

TRANSITION DETECTOR

BACKGROUND OF THE INVENTION

This invention relates to detecting transitions, e.g., phase transitions imparted to a carrier tone or tones as part of a training signal sent from one modem to another.

A typical training sequence begins with the transmission of tones used by the receiver to detect the presence of signal, to set up the analog receiver gain, and to learn any clock or carrier frequency offset, among other things. The next part of the training sequence is a pseudo-random two-phase or four-phase symbol sequence. This sequence is known to the receiver and is used to set up its equalizer in a reference-directed fashion. In order to tell the receiving modem precisely when this part of the training sequence will begin, the transmitting modem precedes it by a 180 degree phase reversal (transition) in the initially transmitted tones. Often the transition occurs a number of symbol intervals before the training sequence is to appear, to provide a period following the transition that is long enough to allow reliable detection of exactly when the transition occurred. Measuring the precise timing of the transition is also an important step in setting up echo cancelers in modems of the type that handle full duplex communication over the two-wire switched telephone network, as in the CCITT standard V.32. Setting up the echo cancelers requires determining the round-trip propagation delay, which is done using a hand-shake procedure based on phase transitions imposed on tones sent back and forth over the channel.

In detecting the time when the transition occurs, the receiving modem must be able to distinguish the intentionally imposed transition from transient disturbances such as phase hits, gain hits, impulse hits, etc., introduced by the telephone channel, which may have an appearance similar to the intentional transition.

In one transition detection scheme, a decision on the transition timing is made as soon as the received tones give the appearance that a transition has occurred. Such decisions are highly susceptible to errors caused by transient disturbances.

A theoretically optimum transition detector (for channels affected only by white Gaussian noise) is one which delays the decision on when the transition occurred as much as possible in order to find the one transition position where the tones match the received signal most closely. Because of the decision delay, such a detector will be more robust in the presence of transient disturbances.

In one implementation of the optimum transition detector, a correlator can be used to choose, as the decision, the one possible transition position which gives the highest correlation between the tones and the received signal. The correlation principle was used by Walsh in "Synchronization of a Data Communication Receiver with a Received Signal," U.S. Pat. 4,290,139, issued Sept. 15, 1981, which discloses a correlator to detect the presence of an expected segment (e.g., a transition) in a received signal. His scheme uses a finite impulse response (FIR) digital filter whose coefficients are chosen to be representative of the filter input during the expected segment. The detection decision is made based on the filter output, which is anticipated to be large when the expected segment is present. A similar scheme is disclosed by Miller in "Modern Signal Acquisition Technique," U.S. Pat. 4,462,108, issued July 24, 1984.

SUMMARY OF THE INVENTION

The invention is a receiver that derives from a received signal a sequence of signal points (each signal point including a symbol and a related distortion sample) made up of a first subsequence of symbols ending at an unknown time instant, and a second subsequence of symbols beginning at the unknown time instant, the first and second subsequences being known to the receiver; the unknown time instant is determined from the derived sequence and the known subsequences by a sequence estimation technique which includes determining and comparing measures (with respect to the derived sequence of received signal points) of known sequences having different possible positions of the unknown time instant.

Preferred embodiments of the invention include the following features. The subsequences are periodic. The periods of the two subsequences are the same, e.g., 2. The first subsequence has alternating complex numbers A and B and the second subsequence has alternating complex numbers C and D. The amplitudes are the same and the phases are 180 degrees apart for A and C, and B and D. In some embodiments the first periodic subsequence consists of a single symbol A, the second periodic subsequence consists of a single symbol C, and A and C have the same amplitudes and a phase difference of 180 degrees. In some embodiments, the second periodic subsequence is zero. For a given symbol $s_{K-1}$ (where $K-1$ is the unknown time instant) that appears in the first subsequence immediately prior to the unknown time instant, the first symbol $s_K$ that appears in the second subsequence immediately after the unknown time instant may only be one of a predetermined set of fewer than all of the symbols in the second subsequence. For successive symbols in the first periodic subsequence the corresponding symbols $s_K$ appear in the order of said possible subsequence. Preferably symbol $s_K$ may only be a predetermined one of the symbols in the second periodic subsequence. The receiver is coupled to a noise-affected channel driven by a transmitter in accordance with the periodic subsequences of symbols. The channel carries at least one tone whose phase and amplitude are determined by the symbols. The tones are used for training the receiver. The symbols are two-dimensional. The sequence estimation technique is a trellis-type technique whose trellis has two states. The measures are computed iteratively only for sequences which, for a given iteration, have accumulated the minimum measure among all sequences with the same future. A final determination is made when, after an iteration, the minimum measure sequence has undergone a transition at least D iterations earlier. Reference symbols are generated corresponding to the known sequences. The squared distance of each signal point from symbols belonging to the subsequences is calculated. Values indicative of the measures are stored. Normalized versions of the measures are generated. A tentative determination is generated earlier than the delayed determination.

The transition is determined more simply, and more effectively than in the correlation detector, and with performance as close to optimum as desired. Only one minimum distance path leading into a successor post-transition state need be stored. Normalization assures that the path metrics do not grow without bound when the pretransition state is more likely, simplifies the computation of one of the path metrics, and precludes the need to store one of the path metrics.

Other advantages and features of the invention will become apparent from the following description of the preferred embodiment, and from the claims.

DESCRIPTION OF THE PREFERRED EMBODIMENT

We first briefly describe the drawings.

Drawings

FIG. 1 is a block diagram of a communication system.

FIG. 2 is a complex signal plane showing four signal points.

Structure and Operation

Figure 3:
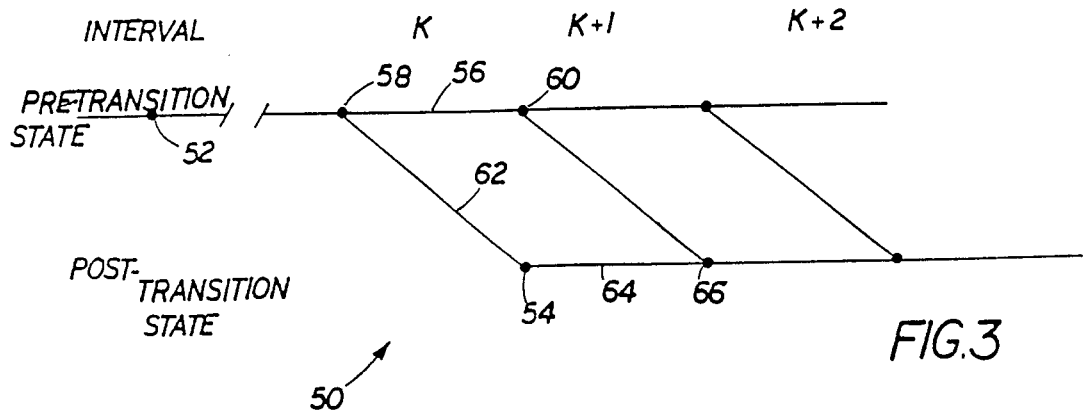
FIG. 3 is a trellis diagram for use with the transition detector of FIG. 1.

Referring to FIG. 1, in a communication system 10, a high-speed, voiceband modem 12 at one end of a telephone channel 14 sends three tones respectively at a carrier frequency of 1800 Hz and at the two band-edge frequencies of 600 and 3000 Hz. The tones are produced digitally beginning with a pair of signal generators 16, 18. Generator 16 delivers a periodic (period=2) complex symbol sequence A, B, A, B, ... at a rate of 2400 symbols per second, where $A=1+j$ and $B=1-j$. A and B represent two-dimensional points on the complex signal plane as shown in FIG. 2. The complex symbols $s_n$, $n=0,1,...$ (n being the index of the symbol interval) represent the in-phase and quadrature components of a conventional quadrature amplitude modulation (QAM) system, where the carrier frequency $f_c=1800$ Hz and symbol interval $T=1/2400$ seconds. The output of a digital QAM modulator 24 is converted to analog in digital-to-analog (D/A) converter 26, and transmitted over channel 14.

The tones produced in this manner start at some time (t=0) by setting a switch 28 to route symbols $s_0$ through $s_{k-1}$ from generator 16 to element 20. The sequence continues until at a certain time (t=KT) the phase of the tones is reversed by throwing switch 28 to its other position to thereafter route symbols $s_n$, $n>K$ from generator 18 to element 20 until n=N. Generator 18 produces a complex symbol sequence C, D, C, D, ..., where $C=-1-j$ and $D=-1+j$. The number K is chosen to be at least some number i symbol intervals. The phase reversal is executed such that if the final symbol out of generator 16 is an A (or B) the first symbol out of generator 18 is a D (or C). As shown in FIG. 2, the sequence generated by generator 18 is 180 degrees out of phase from the sequence generated by generator 16.

At the receiver 29, the analog signals received during the first i symbol intervals (which are known to precede the phase transition, because K is greater than i) are used to detect the presence of a received signal (if not already detected) and then to learn the steady-state channel disturbances in order to set up a coherent receiver for detecting the phase transition. During this period, the gain of the received analog signal is adjusted in element 30 by multiplying it with an analog gain value provided from an automatic gain control (AGC) circuit 32.

In sampler and analog-to-digital (A/D) converter 34, the gain adjusted signal from element 30 is sampled at 7200 Hz and A/D converted at the rate of three output samples per symbol interval. The AGC circuit 32 operates based on the level of these samples. The timing of the sampling is governed by a timing recovery circuit 36 again based on the digital samples. Samples $x_k$ are fed into a fixed, complex phase splitting filter 37 with complex outputs $x'_k$. These are then fed into an adaptive, linear, complex passband equalizer 38 (with tap spacing of T/3) having, e.g., 6 taps. The outputs $y_n$ of equalizer 38 are delivered at the symbol rate (1/T) according to $$y_n = \sum_{j=0}^{5} w_{n,j} x'_{3n-j}, \quad n = 0, 1, \ldots,$$

where $w_{n,j}$ is the coefficient for the jth tap of the equalizer during the nth symbol interval. The equalizer output $y_n, n=0,1,\ldots$, is demodulated by multiplying it in an element 40 by a complex exponential carrier recovery signal, $e^{-j\hat{\theta}_n}$, generated by a carrier recovery circuit 42. $\hat{\theta}_n$ is a demodulation angle generated by a conventional second-order phase-locked loop (not shown) in circuit 42 based in part on the output of element 40. The demodulated output of element 40 is a sequence of received signal points:

$$z_n = y_n e^{-j\hat{\theta}_n}, n=0, 1, \ldots,$$

each comprised of a symbol $s_n$ and a noise sample.

The weights $w_{n,j}$ and the demodulation angle $\theta_n$ are adjusted to minimize the mean-square error between the output $z_n$ of element 40 and a reference sequence $r_n$, $n=0,1,\ldots$, of the form A, B, A, B, ... that is produced by a reference generator 44. A weight updater 46 adjusts the weights $w_{n,j}$ based on the passband error signal $$e_n = (z_n - r_n) e^{j\hat{\theta}_n}$$

using the outputs from element 40, generator 44, and circuit 42. The demodulation phase is adjusted in circuit 42 based on the phase difference between $z_n$ and $r_n$. The equalizer taps are initialized at zero. The alignment between the $X_K$'s and $r_n$ will determine the position of the main (weight with largest magnitude) tap of the equalizer. Because $r_n$ has a period of 2, the ambiguity in the main tap position is only one symbol interval (or 3 taps).

Because the phase transition can be imparted by the transmitter in any interval beginning with the ith interval, a switch 47 (which is kept open until the ith interval) is closed at t=iT thus enabling a transition detector 48 to begin watching for the transition. Also at time t=iT, the step size for weight updater 46 and the phase-locked loop time constant in carrier recovery circuit 42 are reduced (to reduce their effect on the transition detector), and tentative decisions $\hat{r}_n$ from transition detector 48 (described below) are used (in place of $r_n$) to form the error signals in updater 46 and circuit 42, by throwing a switch 49 to the appropriate position.

We turn now to the operation of the transition detector.

Transition detector 48 uses the demodulated complex signal points $z_n$ to make a final transition decision following a delay of D symbol intervals in the following manner.

The possible sequences of sent symbols, e.g., A, B, A, B, ..., B, C, D, C, D, ... can be represented by a so-called two-state trellis diagram 50 as shown in FIG. 3. Trellis diagrams are more fully discussed in "Principles of Digital Communication and Coding", by A. J. Viterbi and J. K. Omura, McGraw-Hill, 1979, incorporated herein by reference. The trellis shows the possible states of the transmitter 12 during each successive symbol interval after interval i. After the ith interval there are potentially two states for the transmitter, a pre-transition initial state 52 and a post-transition state 54.

The pre-transition state corresponds to switch 28 (FIG. 1) in the "up" position with transmitter 12 sending either the symbol A or the symbol B. The post-transition state represents switch 28 in the "down" position with transmitter 12 sending either the symbol C or the symbol D.

A branch that connects a predecessor state to a successor state in the trellis represents a possible state transition in the transmitter. Each branch is associated with a symbol. Thus, beginning with the ith interval, from each pre-transition state occupied prior to a given interval there are two branches, one (e.g., 56) leading to a successor pre-transition state (60) after the given interval (representing the situation in which switch 28 has not been thrown and the phase transition has not occurred), the other (62) leading to a successor post-transition state (54) after the given interval (representing that switch 28 has been thrown and the phase transition has occurred). Each post-transition state 54 has only one branch 64 leading from it and that branch leads to the successor post-transition state 66, reflecting the fact that, once the phase transition has occurred, there is no return to the pre-transition state. Branches leading to the post-transition state are associated with output symbols C and D alternatingly and the branches leading to the pre-transition state are associated with output symbols A and B alternatingly, and in synchronism such that A and C or B and D belong to the same symbol interval.

Every possible transmitted symbol sequence $\{s_n\}$ (where $\{s_n\}$ undergoes a single transition no sooner than the ith interval) is thus represented by a path through trellis 50, where the path is a chain of the branches from left to right. The goal of transition detector 48 is to determine the interval in which the transition from the pre-transition state to the post-transition state has occurred. Specifically, the goal is to find the path through the trellis which was most likely to have been traversed by the transmitter in sending sequence $\{s_n\}$, based on the corresponding received sequence $\{z_n\}$. When distortion samples are uncorrelated and Gaussian, the most likely sent sequence $\{s_n\}$ is the one that is closest (in the sense of Euclidean distance) to the received sequence $\{z_n\}$; i.e., the estimate $\{s_n\}$ minimizes the distance metric or measure $$d^2 = \sum_{n=i}^{N} |z_n - s_n|^2.$$

The metric $d^2$ for a path in the trellis can be computed recursively, such that the metric accumulated up to position $n$ is the sum of the path metric accumulated up to position $n-1$ plus the branch metric $|z_n - s_n|^2$ for the nth symbol interval.

It is not necessary to explicitly compute the metric for all possible paths. First, it is recognized that in a recursive computation, at any given time only the minimum distance path leading into the successor post-transition state needs to be retained, because all such paths have the same future (i.e., a path confined to the post-transition state). Also, as we shall see, with appropriate normalization of the other path metric it is not necessary to store the metric of this path.

The optimum detector has to delay the transition decision until time $n = N$ in order to examine the entire received signal. In many applications this may be an excessive delay. Therefore a decision will be made after a fixed delay of D intervals where D will depend on the application. Those skilled in the art will recognize that the path which is ultimately selected is the one with the earliest transition position K where the pre-transition state is more likely at position $K-1$, the post-transition state is more likely at position K, and the post-transition path remains more likely compared to the pre-transition path for D symbol intervals.

Figure 4:
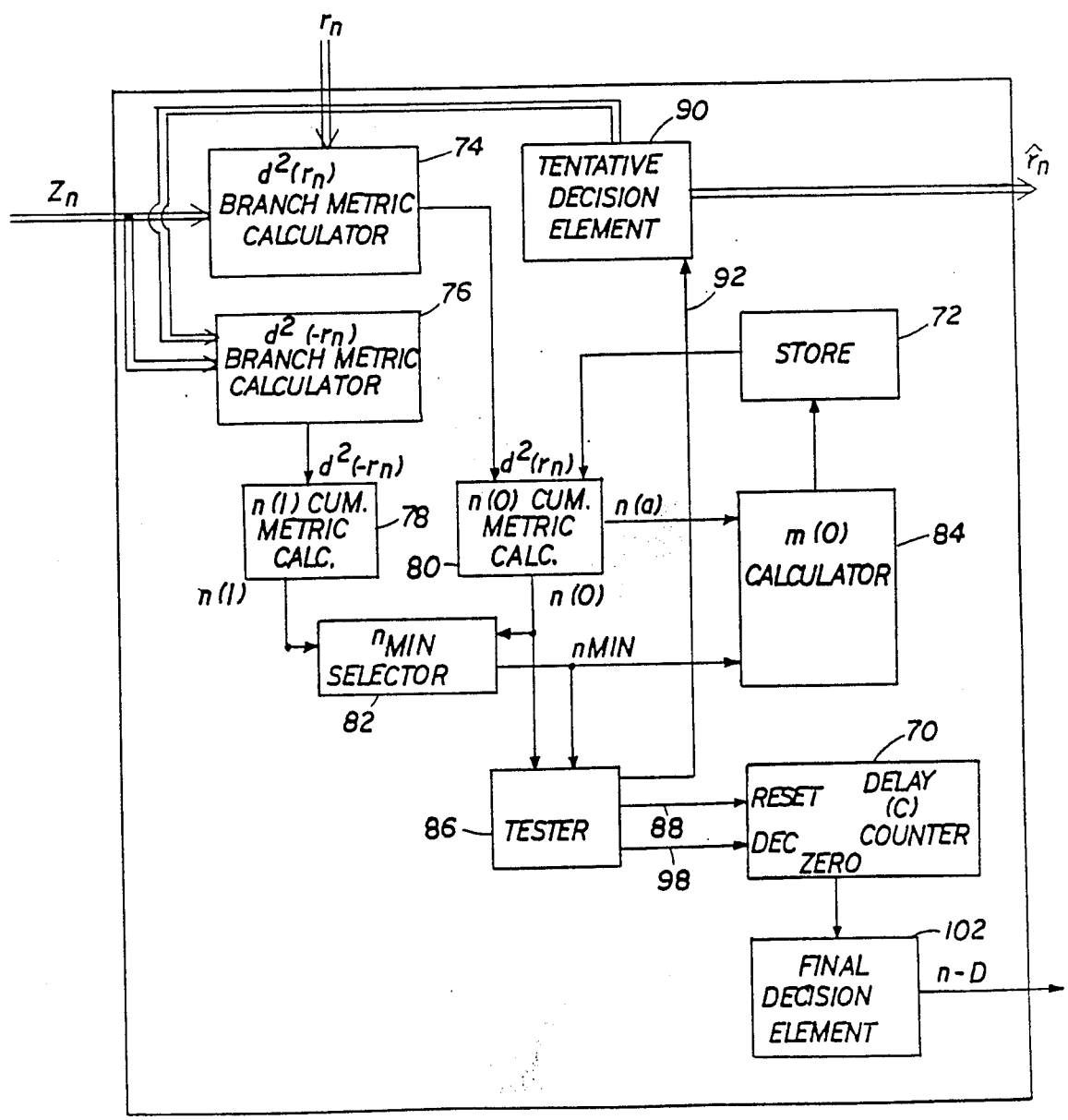
FIG. 4 is a block diagram of the transition detector.
Figure 5:
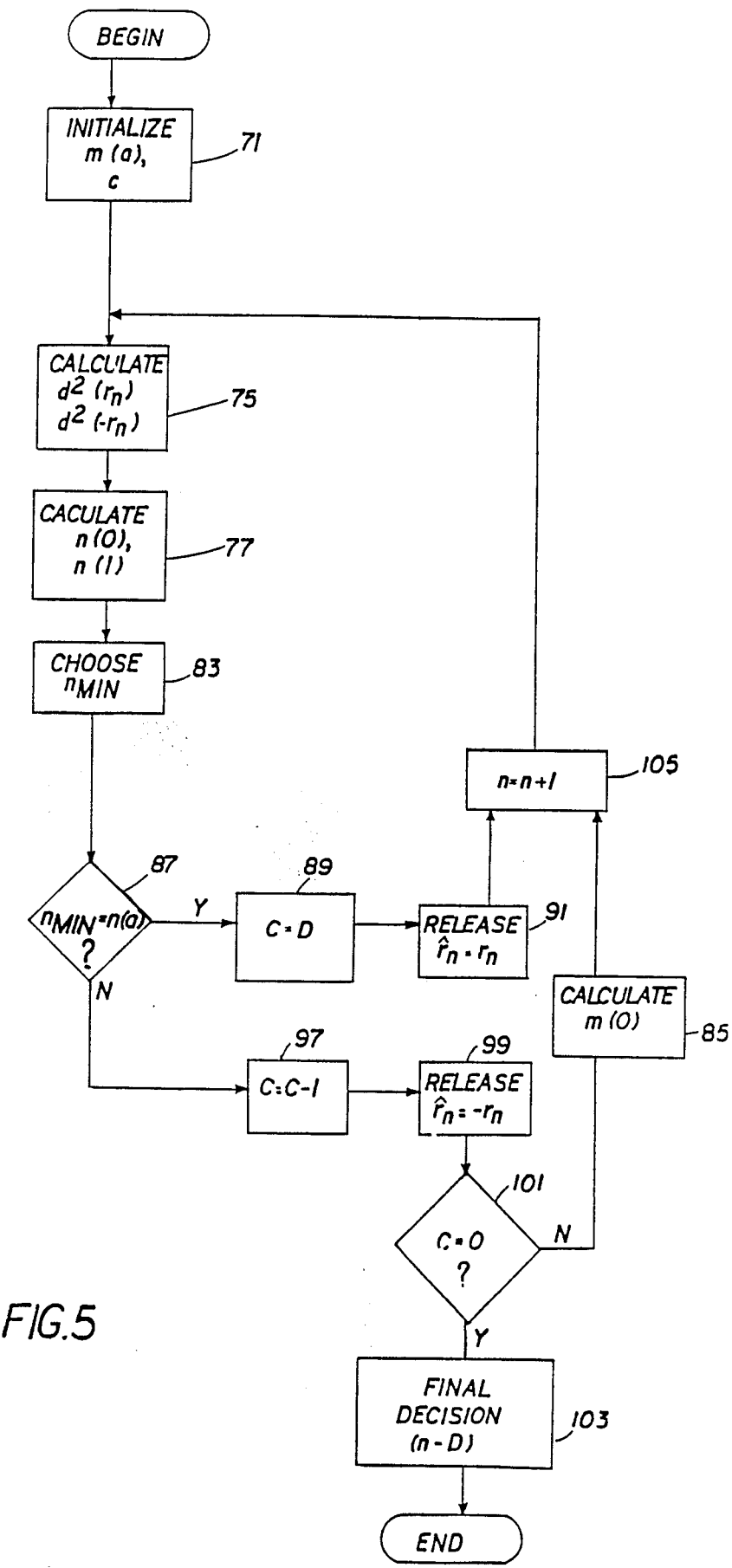
FIG. 5 is a flow chart of the transition detection process.

Referring to FIGS. 4, 5, transition detector 48 includes a delay counter C 70 that keeps track of the number C of intervals that remain before D intervals will have elapsed since a transition first appears to have occurred (or the post-transition state becomes more likely). Counter 70 is initialized (71) to $C=D$. Detector 48 also includes a store 72 that holds a value, m(0), which is a normalized metric for the path ending in a pre-transition state following the nth interval. m(0) is initialized (71) to zero.

Each received signal, $z_n$, is delivered to a $d^2(r_n)$ branch metric calculator 74, and to a $d^2(-r_n)$ branch metric calculator 76. The corresponding reference signal $r_n$ is also delivered to calculators 74, 76.

Calculator 74 calculates (75) the squared distance $d^2(r_n)$ between the received signal $z_n$ and the reference signal $r_n$. This is the branch metric for the transition to the pre-transition state. Calculator 74 thus calculates $$d^2(r_n) = |z_n - r_n|^2.$$

Branch metric calculator 76 calculates (75) the distance $d^2(-r_n)$ between the received signal $z_n$ and the negative of the reference signal $r_n$. This is the branch metric for the transition to the post-transition state. Calculator 76 thus calculates $$d^2(-r_n) = |z_n + r_n|^2$$

for a branch like branch 62 or branch 54 in FIG. 3.

The outputs of branch metric calculators 74, 76 are delivered respectively to n(1) and n(0) cumulative metric calculators 78, 80.

n(0) cumulative metric calculator 80 finds (77) the normalized cumulative metric of the path that ends in the successor pre-transition state by adding $d_i(r_n)$ to m(0), the normalized metric for the path ending in the predecessor pre-transition state, stored in m(0) store 72.

n(1) cumulative metric calculator 78 sets (77) the cumulative metric for the path that ends in the successor post-transition state equal to $d^2(-r_n)$.

An $n_{min}$ selector 82 then chooses (83) the minimum metric as between n(0) and n(1), i.e., $n_{min} = \min(n(0), n(1))$.

A tester 86 then tests (87) whether $n_{min} = n(0)$. If $n_{min} = n(0)$, then counter 70 is reset (89) to $C = D$ in response to a reset signal sent over line 85; also a tentative decision element 90 releases (91) $\hat{r}_n = r_n$ as a tentative decision for the current interval in response to a release signal sent over line 92. If $n_{min}=n(1)$, counter 70 is decremented by one (97) to $C=C-1$ in response to a decrement signal sent over line 98; also element 90 releases (99) $r_m=--r_n$ as a tentative decision in response to a release signal sent over line 92. If C is found to be zero (101), a final decision element 102 issues (103), as a final decision, an indication that the transition occurred in the $n-D$ interval, and the procedure ends. If C is not zero, an m(0) calculator 84 then normalizes (85) the cumulative metric for the path ending in the pre-transition state according to $m(0)=n(0)-n_{min}$. m(0) will be zero if the pre-transition state is more likely. Otherwise it represents the accumulated metric difference between the pre-transition path and the most likely post-transition path.

The normalization prevents the unbounded growth of the metrics, when the pre-transition state is more likely, simplifies the computations, and precludes the need to store n(1). Then n is incremented to n+1 and the next received signal $z_n$ is processed.

As D is increased, the performance of the detector approaches that of the optimum detector.

Transition detector 48 may be implemented in a programmable signal processor of the kind shown in co-pending U.S. patent application Ser. No. 586,681, filed Mar. 6, 1984, assigned to the same assignee as this application, and incorporated herein by reference.

Other embodiments are within the following claims. The coherent receiver structure can be modified. Some form of limiting can be used to increase the robustness of the detector against transient disturbances. Such limiting can, for example, be applied to the branch metrics. Other modifications of the branch metric are also possible. The technique can be generalized to the problem of detecting the unknown transition instant from a known first periodic subsequence to a second known periodic subsequence. In particular, it can be used to detect a phase transition in a single tone in which case the subsequences will be of the form A, A, A, ..., and C, C, C, ..., both of period 1. Applications where the subsequences are not necessarily periodic are also possible. For example the scheme can be used to detect a loss of any known sequence. In this case, the second subsequence will be identically zero.

I claim:

1. A receiver comprising
   means for deriving from a received signal a sequence of signal points, each said signal point comprising a symbol and a distortion sample, said sequence comprising a first periodic subsequence of said symbols ending at an unknown time instant, and a second periodic subsequence of said symbols beginning at said unknown time instant, one period of each said first and second subsequences being known to said receiver, and
   means for determining said unknown time instant from said derived sequence by comparing measures, with respect to said sequence of signal points derived by said receiver, of sequences corresponding to all possible combinations of said first and second subsequences, said combinations corresponding to different possible positions of said unknown time instant.

2. The receiver of claim 1 wherein said unknown time instant is determined by a trellis-type sequence estimation technique whose trellis has two states.

3. The receiver of claim 1 wherein the periods of said first and second periodic subsequences are the same.

4. The receiver of claim 3 wherein the periods of said first and second periodic subsequences are 2.

5. The receiver of claim 4 wherein said first periodic subsequence comprises alternating complex numbers denoted A and B, and said second periodic subsequence comprises alternating complex numbers denoted C and D.

6. The receiver of claim 5 wherein said complex numbers represent signal amplitude and phase, and said amplitudes are the same and said phases are 180 degrees apart for A and C, and for B and D.

7. The receiver of claim 3 wherein the periods of said first and second periodic subsequences are one and said first periodic subsequence comprises A, said second periodic subsequence comprises C, and said amplitudes are the same and said phases are 180 degrees apart for A and C.

8. The receiver of claim 1 wherein said second subsequence is zero.

9. The receiver of claim 1 wherein for a given symbol $s_{k-1}$ that appears in said first subsequence immediately prior to said unknown time instant, the first symbol $s_K$ that appears in said second subsequence immediately after said unknown time instant may only be one of a predetermined set of fewer than all of the symbols in said second subsequence.

10. The receiver of claim 9 wherein for successive symbols in said first subsequence the corresponding symbols $s_K$ appear in the order of said second subsequence.

11. The receiver of claim 9 wherein said symbol $s_K$ may only be a predetermined one of said symbols in said second subsequence.

12. The receiver of claim 1 further comprising
    means for coupling said receiver to a noise-affected channel driven by a transmitter in accordance with said subsequences of symbols.

13. The receiver of claim 12 wherein said symbols are complex numbers.

14. The receiver of claim 1 wherein said measures are computed iteratively only for sequences which for a given iteration have accumulated the minimum measure among all sequences with the same future.

15. The receiver of claim 14 wherein a final determination is made when, after an iteration, the minimum measure sequence has undergone a transition at least D iterations earlier.

16. The receiver of claim 14 further comprising a reference generator for delivering to said means for determining a sequence of reference symbols corresponding to said known sequences.

17. The receiver of claim 14 wherein said means for determining and comparing measures comprises means for calculating with respect to each said signal point in said sequence its squared distance respectively from symbols belonging to said first subsequence and said second subsequence.

18. The apparatus of claim 14 wherein said means for determining further comprises means for storing values indicative of said measures.

19. The apparatus of claim 14 wherein said means for determining further comprises means for generating normalized versions of said measures.

20. The receiver of claim 14 further comprising a means for generating a tentative determination earlier than said delayed determination.

* * * * *

UNITED STATES PATENT AND TRADEMARK OFFICE
CERTIFICATE OF CORRECTION

PATENT NO. : 4,745,625
DATED : May 17, 1988
INVENTOR(S) : Vedat M. Eyuboglu

It is certified that error appears in the above-identified patent and that said Letters Patent is hereby corrected as shown below:

Col. 4, line 16, "$W_{nj}X'_{3n-j}$," should be --$W_{n,j}X'_{3n-j}$,--.

Col. 4, line 19, "$W_{nj}$" should be --$W_{n,j}$--.

Col. 4, line 21, "$Y_{n},n$" should be --$Y_{n,\ n}$--.

Col. 4, line 33, "$W_{nj}$" should be --$W_{n,j}$--.

Col. 4, line 38, "$W_{nj}$" should be --$W_{n,j}$--.

Col. 6, line 54, "$d,(r_n)$" should be --$d^2(r_n)$--.

Col. 7, line 4, "$(99)r_m=--r_n$" should be --$(99)r_n=-r_n$--.

Signed and Sealed this

Second Day of January, 1990

Attest:

JEFFREY M. SAMUELS

*Attesting Officer*     *Acting Commissioner of Patents and Trademarks*